United States Patent [19]

Hunter

[11] Patent Number: 4,515,355

[45] Date of Patent: May 7, 1985

[54] SHEET METAL WORKHOLDER UTILIZING LINEAR WEDGE ACTION

[75] Inventor: James R. Hunter, Chadds Ford, Pa.

[73] Assignee: The Warner & Swasey Company, Cleveland, Ohio

[21] Appl. No.: 390,150

[22] Filed: Jun. 21, 1982

[51] Int. Cl.[3] .................... B23Q 3/18

[52] U.S. Cl. .................... 269/234; 269/239

[58] Field of Search .................... 83/277, 452; 269/239, 269/91, 93, 94, 134, 136, 138, 234

[56] References Cited

U.S. PATENT DOCUMENTS 3,758,099 9/1973 Scott .................... 269/234

4,365,792 12/1982 Johns .................... 269/234

FOREIGN PATENT DOCUMENTS 163854 12/1981 Japan .................... 269/234

*Primary Examiner*—Robert C. Watson

*Attorney, Agent, or Firm*—Howard G. Massung; Raymond J. Eifler

[57] ABSTRACT

A sheet metal holder (20) utilizing a linear wedge action for use on a sheet metal working machine (10). A pair of holders (20) are movable on machine (10) to provide for two axes positioning of a worksheet. Workholder (20) is formed from a box shaped member (32) having a pivot arm (31) movable about a pivot connection (42) within box member (32) and extending therefrom. A fixed jaw (34) extends from box member (32). A movable clamping jaw (30) is formed at the free end of pivot arm (31). A linear actuator bar (26) engages pivot arm (31) and forces jaws (31, 34) to close on a worksheet. Linear actuator bar (26) and pivot arm (31) are constructed to make the workholder (20) self locking. An appropriate actuator is provided for positioning bar (26).

1 Claim, 3 Drawing Figures

SHEET METAL WORKHOLDER UTILIZING LINEAR WEDGE ACTION

BACKGROUND OF THE INVENTION

1. Technical Field

This invention relates to metal working and more particularly to an improved sheet metal workholder.

2. Background Art

Workholders for gripping sheet material which is to be positioned are well known in the art. U.S. Pat. No. 3,835,743 is exemplary of prior art workholders having a pivot arm with gripper jaw formed at one end and the other end positioned by an actuator. U.S. Pat. Nos. 3,174,747 and 2,701,017 show examples of other known workholders.

DISCLOSURE OF THE INVENTION

The present invention teaches an improved workholder using a linear wedge action for strong gripping of a sheet workpiece. The worksheet holder comprises a lower jaw; an upper jaw pivotally connected for movement at one end with respect to said lower jaw; an upper jaw actuator linearly movable between an advance position, urging the upper jaw toward the lower jaw, and a retracted position; and an elongated box shaped member extending from said lower jaw around the pivot end portion of the upper jaw for retaining and guiding the upper jaw actuator into contact with the upper jaw when the upper jaw actuator is advanced.

Pivoting upper clamp jaw is forced downward to capture a worksheet between itself and the lower jaw. The actuating force is provided by the linear acting actuator bar which is coupled to an air or hydraulic cylinder. The resulting stress and deflection in the vertical plane is contained in a local area by the box shaped end of the workholder. With this construction increased workholder length is possible without requiring the additional elevation which is necessary for a workholder requiring a longer pivot arm. The rigidity of the box member will allow for a higher gripping force to be used. The gripping mechanism is also self-locking and will retain a sheet even if power or control to the actuator is lost.

BRIEF DESCRIPTION OF THE DRAWINGS

For a better understanding of the invention, reference may be had to the preferred embodiment exemplary of the invention shown in the accompanying drawings in which.

BEST MODE FOR CARRYING OUT THE INVENTION

Figure 1:
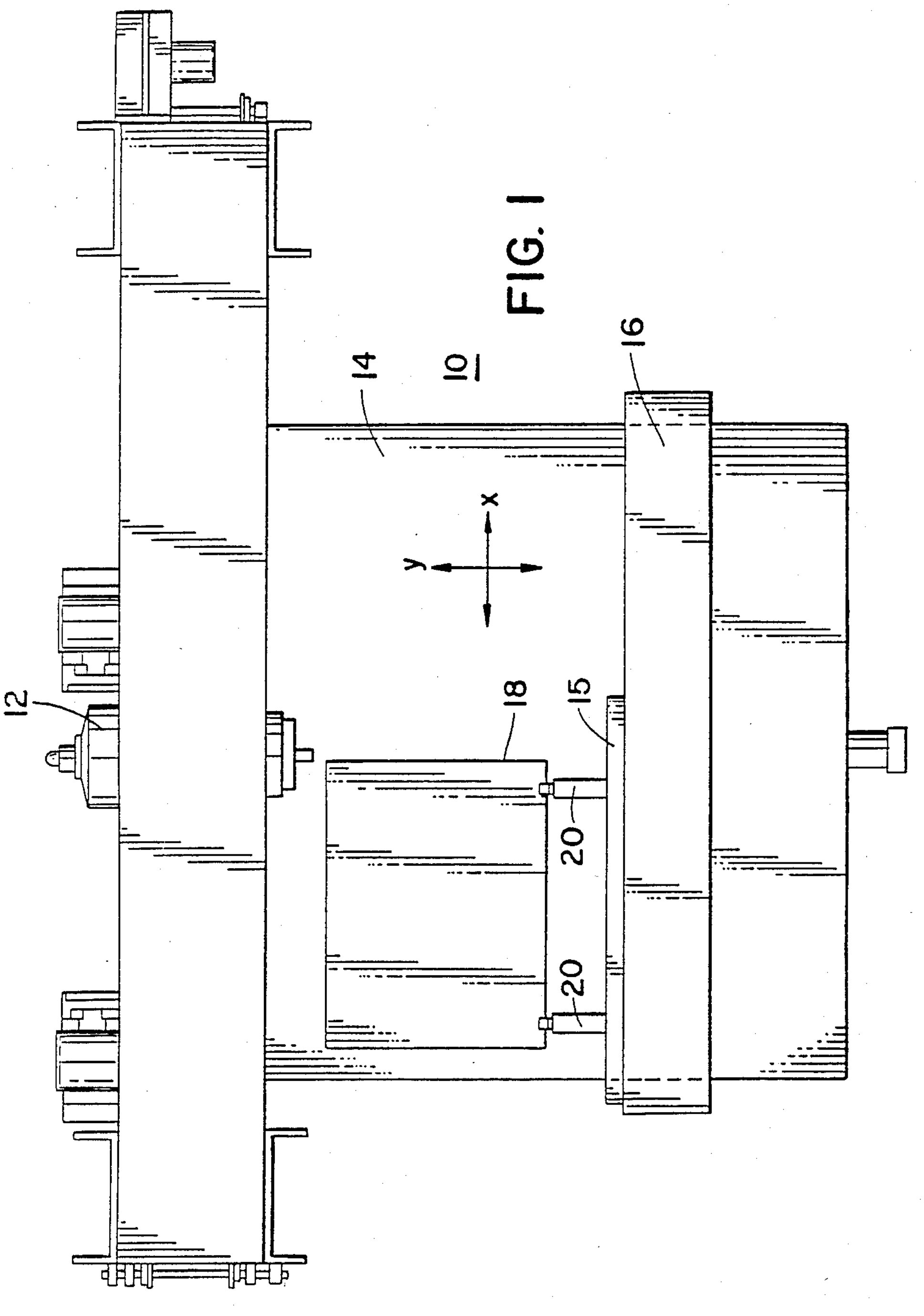
FIG. 1 is a top view of a punch press showing a workholder according to the present invention gripping a sheet.

Referring now to the drawings, there is shown in FIG. 1 a punch press 10 having a punch head assembly 12 for operating on a worksheet supported in a horizontal plane by table assembly 14. Sheet metal grippers 20 are attached to cross slide 15 which is supported by carriage 16. Sheet metal grippers 20 grip and position the sheet metal workpiece 18. Carriage 16 is movable along table 14 in the Y-axis direction. Sheet grippers 20 are mounted from cross slide 15 which is movable on carriage 16 in the X-axis direction. The position of grippers 20 on cross slide 15 is adjustable. Suitable power drive mechanisms are provided for positioning carriage 16 along table 14 and for positioning cross slide 15 and attached sheet metal grippers 20 along carriage 16. Two axes positioning of the worksheet 18 to desired locations can thus be achieved.

Figure 2:
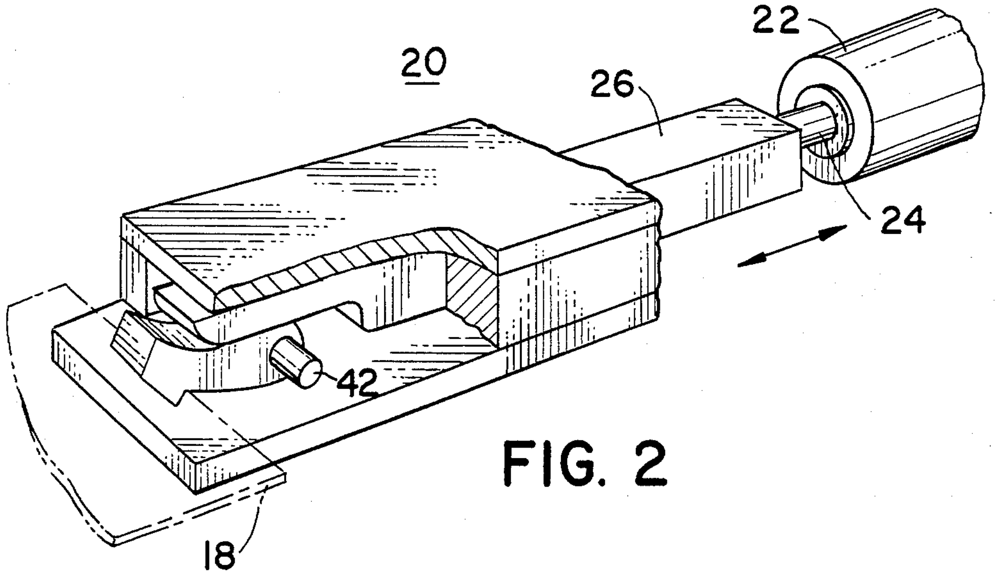
FIG. 2 is an isometric view of a workholder according to the present invention.
Figure 3:
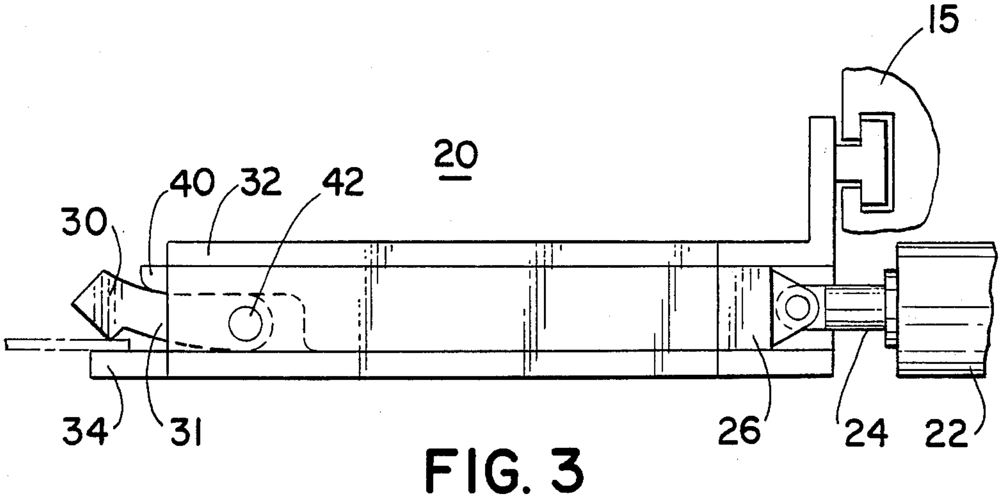
FIG. 3 is a side view of the worksheet holder shown in FIG. 2.

Referring now to FIGS. 2 and 3 there is shown a more detailed view of sheet metal gripper 20. Sheet metal gripper 20 is actuated by a suitable air or hydraulic cylinder 22. Cylinder 22 has an actuating rod 24 which is connected to an actuator bar 26. Cylinder 22 in response to appropriate control signals advances or retracts actuator bar 26.

An upper clamp jaw 30 is formed on the free end of arm 31 which is on a pivot connection 42 within a box shaped member 32. Projecting from the bottom end of box shaped structure 32 is a lower fixed jaw 34. During operating a workpiece 18 is clamped between lower jaw 34 and the upper movable clamp jaw 30. When the upper jaw actuator bar 26 is advanced outward its shaped outer end 40 engages pivot arm 31 and urges upper clamp jaw 30 into high pressure engagement with a sheet metal workpiece 18.

Pivot arm 31 with upper clamp jaw 30 attached is pivoted at one end about pivot pin 42. Pivot pin 42 is disposed within box shaped member 32. To operate or release the upper clamp jaw 30 the actuator bar 26 is linearly movable either forward or backward. The disclosed workholder 20, in comparison with prior grippers, is capable of providing increased gripping force for given height constraints and allows a longer workholder to be constructed. The length of the workholder can be increased by increasing the length of the box shaped member 32 and the actuator bar 26, but without changing the length of pivot arm 31 which supports upper clamp jaw 30. The strength and deflection in the vertical plane when gripping a worksheet is contained in a local area by the box shaped member 32. The rigidity of the box shaped member 32 will allow higher gripping forces to be used to prevent loss of sheet 18 in operation.

Workholder 20 is also self-locking and will retain a worksheet 18 even if electric power, or air or hydraulic pressure is lost during operation. Pivot arm 31 and actuator bar 26 are constructed so that when they are engaged the friction holding forces prevent them from sliding to a disengaged position. A positive withdrawal of bar 26 is required to release the clamping jaws 30, 34. Prior art workholders require special air valves and/or circuitry to trap air under these conditions to provide for failsafe operation and prevent possible safety hazards of the worksheet coming loose during operation.

I claim:

1. A clamp assembly for holding a sheet of material during operation of a machine tool, said clamp assembly comprising a box structure having parallel upper and lower walls and a pair of parallel side walls extending between the upper and lower walls, said lower wall of said box structure having an outer end portion which forms a fixed jaw engageable with a lower side surface of the sheet of material, a movable jaw, means for pivotally mounting said movable jaw on the side walls of said box structure, said movable jaw having an outer end portion with a lower side which engages an upper side of the sheet of material at a location above said fixed jaw, said outer end portion of said movable jaw having an upper side with an arcuate cam surface which curves upwardly to a location above where the outer end portion of the movable jaw engages the sheet of material, a reciprocatable slide member disposed within said box structure, said slide member having flat parallel upper and lower surfaces disposed in abutting engagement with inner side surfaces of said upper and lower walls of said box structure and having flat parallel side surfaces disposed in abutting engagement with inner side surfaces of said side walls of said box structure, said slide member having a leading end portion with an upper side surface disposed in abutting engagement with the upper wall of said box structure and having a lower side surface which is spaced from the lower wall of said box structure and faces downwardly toward the lower wall of said box structure, said lower side surface on the leading end portion of said slide member being movable into abutting engagement with said arcuate cam surface on the upper side of said movable jaw at a location above where said fixed jaw engages the sheet of material, and motor means for moving said slide member outwardly toward said movable jaw to press the lower side surface on the leading portion of said slide member against the arcuate cam surface on said movable jaw to thereby press said movable jaw downwardly against the sheet of material to clamp the sheet of material between said fixed and movable jaws and for moving said slide member rearwardly away from said movable jaw to move the leading end portion of said slide member out of engagement with the arcuate cam surface on said movable jaw to thereby release the sheet of material.

* * * * *